Figure 1:
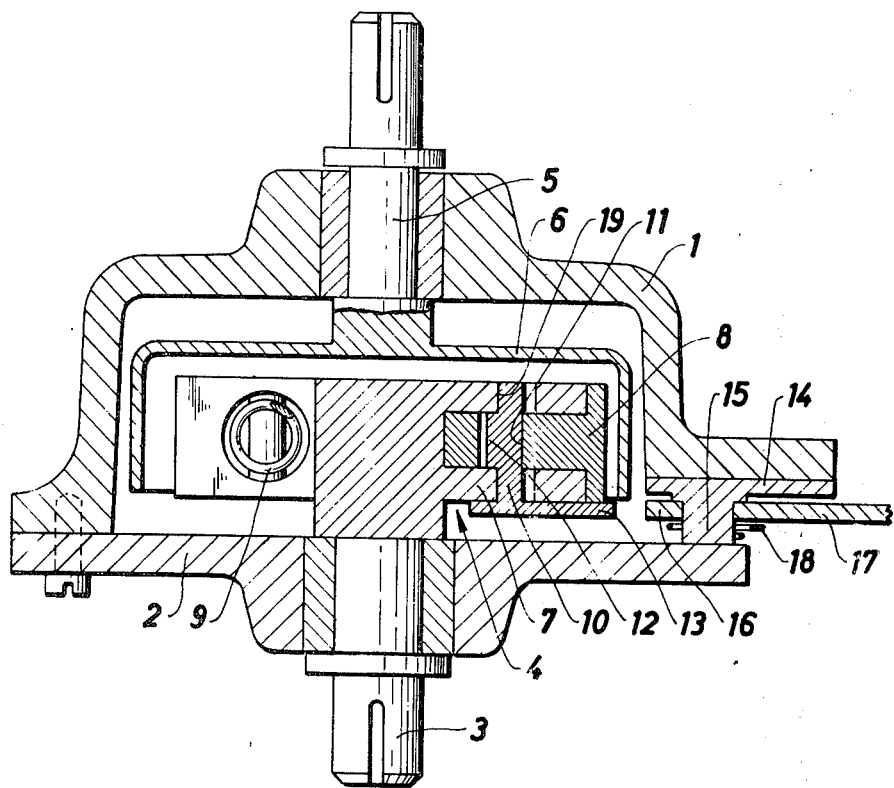

United States Patent
Kesselmark et al.

[11] 3,980,165
[45] Sept. 14, 1976

[54] DEVICE IN CONNECTION WITH CENTRIFUGAL COUPLINGS

[76] Inventors: Mats Kesselmark, Vattugatan 45, S-382 00 Nybro; Bengt Morner, Ryetuageu 9, Hovas, both of Sweden

[22] Filed: June 3, 1974

[21] Appl. No.: 476,070

[30] Foreign Application Priority Data
July 9, 1973  Sweden .............................. 7309603

[52] U.S. Cl. ..................... 192/105 CE; 192/103 B; 192/89 A
[51] Int. Cl.² ................... F16D 43/24; F16D 23/00
[58] Field of Search ............ 192/26, 105 CE, 103 B, 192/105 BA, 105 BB, 105 CD, 89 A

[56] References Cited
UNITED STATES PATENTS

| | | | |
|---|---|---|---|
| 1,692,735 | 11/1928 | Heger | 192/105 CD X |
| 1,811,974 | 6/1931 | Searle | 192/103 B X |
| 1,984,131 | 12/1934 | Hamilton | 192/105 CD |
| 2,048,435 | 7/1936 | Dodge | 192/105 CE |
| 2,130,486 | 9/1938 | Florcyk | 192/26 |
| 2,493,744 | 1/1950 | Berger | 192/105 CE X |
| 2,534,426 | 12/1950 | Eason | 192/105 CE |
| 2,754,949 | 7/1956 | Croy | 192/105 CE |
| 3,058,561 | 10/1962 | Spalding | 192/105 CE |
| 3,258,095 | 6/1966 | Shelton | 192/103 B |
| 3,724,622 | 4/1973 | Barbulesco | 192/105 CE |
| 3,727,738 | 4/1973 | Briar | 192/105 CE |
| R20,903 | 11/1938 | Royse | 192/105 CD |

*Primary Examiner*—Samuel Scott
*Assistant Examiner*—Lance W. Chandler
*Attorney, Agent, or Firm*—Ulle C. Linton

[57] ABSTRACT

A centrifugal clutch having an internal drum surface on a driven member with friction shoe members displaceable on a driving member to and from said drum surface but normally drawn away therefrom by resilient means and each having an opening with a cam shaft extending therethrough, each cam shaft being rotatable in elongated openings in said driving member and having a lever extending towards said drum surface and another lever pivotally mounted on said clutch and positioned for engaging said first levers when desired to pivot said first levers from said drum surface and allow said resilient means to move said shoe members from said drum surface even when said driving member is rotating at a speed that normally would cause said shoe members, due to centrifugal force, to engage said drum surface.

3 Claims, 5 Drawing Figures

DEVICE IN CONNECTION WITH CENTRIFUGAL COUPLINGS

The present invention relates to an improvement in centrifugal couplings.

A centrifugal coupling of conventional design as is known functions in such a way that a number of clutching elements by the centrifugal force are pressed against a drum, whereby the coupling by friction can transmit torque forces. This pressing takes place only when the clutching elements rotating together with the driving shaft have reached a certain number of revolutions per minute, when they overcome the bias of springs, which tend to press them in direction towards the center of the coupling assembly. In order to disengage the coupling, a reduction in the number of revolutions is required and this so far that the springs can overcome the centrifugal force and withdraw the clutching elements. Due to the fact that the clutching elements in engaged condition exhibit a greater radius of center of gravity than in withdrawn condition, the centrifugal force in the outer position will be greater than in the inner position, as a result of which the number of revolutions, at which the springs can withdraw the clutching elements, generally is greater than the number of revolutions, at which the clutching elements by the centrifugal force overcoming the bias of the springs are flung in an outward direction, i.e. "the clutching number of revolutions".

Thus, in order to that an engaged clutch can be disengaged, many times a considerable reduction of the number of revolutions of the driving shaft is required, and this reduction of the number of revolutions can take a comparatively long time, which in many cases is not acceptable and involves a risk, viz. in the cases when a continued drive can give rise to damage. Therefore there is a great need for a device, by means of which a centrifugal coupling selected because of its otherwise excellent and many times indispensable qualities as a protective function can be made instantaneously disengageable.

It is an object of the present invention to provide such a device, by means of which a centrifugal coupling can be disengaged by force without the number of revolutions of the driving shaft necessarily being reduced, whereby anyhow an engagement automatically takes place only at a temporary reduction of the number of revolutions to and below the number of revolutions of engagement respectively.

Figure 2:
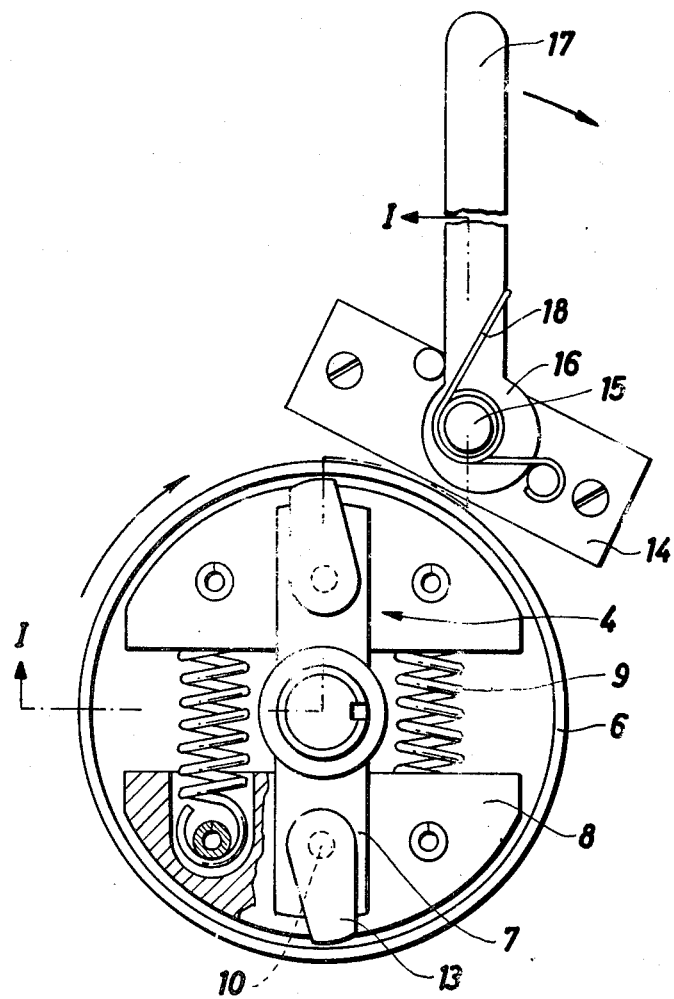
Figure 3:
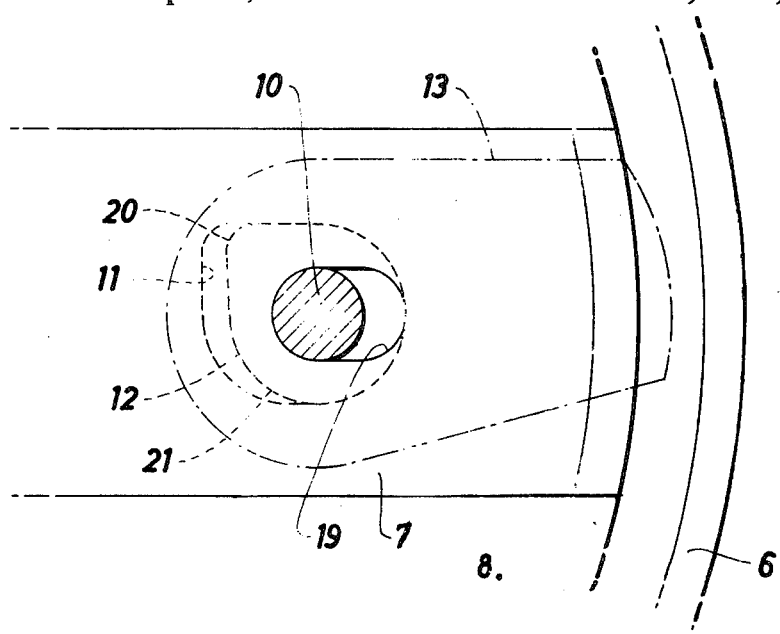
Figure 4:
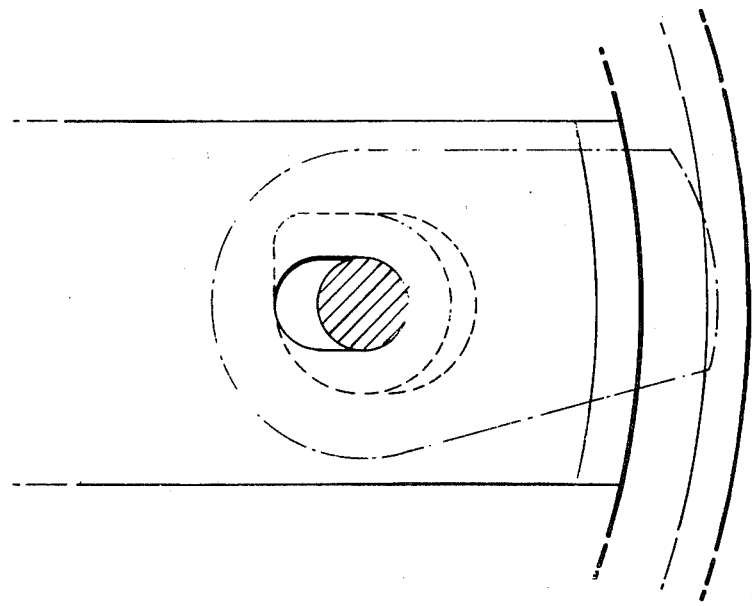
Figure 5:
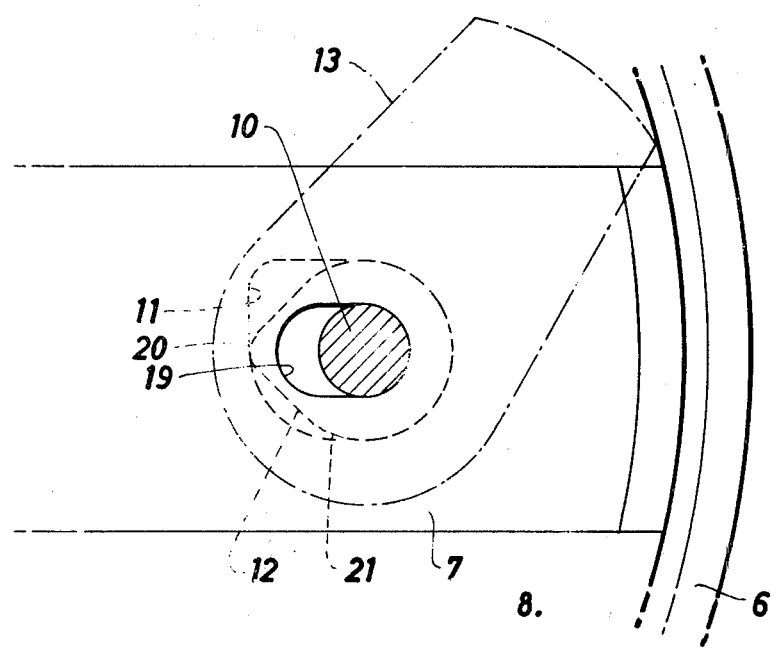

An example of an embodiment of the invention is illustrated in the accompanying drawings, in which FIG. 1 is a central cross sectional view through a coupling unit, FIG. 2 is a front view of the parts in the interior of the coupling, and FIGS. 3, 4 and 5 are broken out views on an enlarged scale of a portion of the coupling in different working positions.

According to FIG. 1 the coupling unit comprises a housing 1 with a cover 2. In the cover 2 a driving shaft 3 with a hub 4 is journalled for connection with the driving motor or the like. A shaft 5 with a coupling drum 6 is journalled in the housing 1, which shaft is provided for connection with the unit intended to be driven. The coupling hub 4 has two radially extending carrier arms 7, on each one of which a coupling element 8 is mounted, so that it can be displaced in radial direction. The two coupling elements 8 are biased by two tension springs 9, which tend to withdraw the coupling elements towards the center of the coupling hub 4. In each one of the carrier arms 7 a shaft 10 is journalled in holes 19 with a cam part 12 cooperating with a hole 11 in the coupling element 8, an arm 13 being journalled at one end of said shaft 10.

In the housing 1 there is an eccentric 16 with a bar 17 journalled by means of a plate 14 with a pivot 15. A torsion spring 18 tends to keep the eccentric in such a position that it is unimpeded by the arms 13, right in front of which the eccentric is located in axial direction. In a pivoting movement carried out by means of the bar 17 the eccentric 16 can be brought down, so that it extends inside the pivoting circle described by the outer ends of the arms 13.

As is evident from the FIGS. 3 – 5 the holes 19 in the split carrier arms 7 for the shafts 10 are of oblong shape in radial direction. The shape of the hole 11 of the coupling elements 8 provided for the cam 12 is also evident from FIG. 3, and as a main portion it exhibits a tangential wall directed inwards towards the center of rotation. As is evident from the same figures the cam 12 is provided with a top 20, which via straight surfaces passes on to a basic circular contour 21.

When the arms 13 point outwards the coupling elements 8 have a full space to move in the coupling hub 4, and the coupling can work as a conventional centrifugal coupling. At a low number of revolutions the coupling elements thus are pressed in towards the center, as is shown in FIG. 3, exhibiting a play relative to the coupling drum 6, whereby the coupling is non-driving. Above the number of revolutions for engagement, see FIG. 4, the coupling elements 8 are pressed against the coupling drum 6, and the coupling will be driving. The shaft 10 in the hole 19 and the cam 20 in the hole 11 still have enough space to move in order not to impede the movement of the coupling element 8.

If in this position a disengagement is desired the bar 17 is moved clockwise (as seen in FIG. 2), whereby the eccentric 16 will arrive within the path of pivoting of the arms 13, so that said arms strike against the eccentric 16 and are turned back to the position illustrated in FIG. 5. The top 20 of the cam 12 then will make contact with the tangential surface of the hole 11 of the coupling element 8 and the shaft 10 at the same time will bear against the opposite side of the hole 19, whereby the coupling element 8 is pressed inwards and out of contact with the coupling drum 6. The coupling thus is disengaged. The produced movement of the arms 13 is adjusted in such a manner that a line through the cam top 20 and the center of the shaft 10 is perpendicular to the tangential surface of the hole 11. By this arrangement the shaft 10 is not subjected to any torque from the coupling element 8, which tends to be flung outwards by the centrifugal force from the unit still rotating above the number of revolutions for disengagement. The pressure exercised against the cam top 20 on the contrary tends to keep the unit 10, 12, 13 in the position illustrated in FIG. 5 in spite of the centrifugal force biasing the arm 13 tending to direct said centrifugal force in radial direction to the position illustrated in the FIGS. 3, 4. However, if the number of revolutions is reduced to a value below the number of revolutions for disengagement the coupling elements are withdrawn in inwards direction by the springs 9, and the pressure against the cam top 20 ceases. On the other side the coupling hub continues its rotation and the arm 13 is still subjected to a centrifugal force, so that the unit 10, 12, 13 will be pivoted to the position shown in FIGS. 3, 4. The coupling now has returned to its normal starting position, and when the number of revolutions is increased, a new engagement takes place, and the coupling works as a conventional centrifugal coupling.

Thus, the device according to the invention normally does not influence the characteristics of the coupling as a centrifugal coupling, but a disengagement by force can take place above the number of revolutions for disengagement, whereafter a return to normal coupling function can take place by a reduction of the number of revolutions to below the number of revolutions for disengagement.

The device according to the invention can be adapted to other types of centrifugal couplings than the one illustrated, by way of example such couplings, which exhibit a greater number of coupling elements than two. In a common type of centrifugal couplings, the outgoing part, viz. the coupling drum, is journalled on a pivot of the driving shaft, which in its turn is journalled in a fixed bearing.

Also the very device according to the invention can be varied within the scope of the following claims. Thus, the operation eccentric can be substituted by a great many different types of striking organs, by way of example a pin, which can be axially introduced into the path of the actuating arms. The design of the actuating organs of the coupling elements is partly determined by the general design of the coupling.

We claim:

1. In a centrifugal clutch comprising a rotary driving member, a rotary driven member having an internal drum surface, bearing means for rotatably supporting said driving member and said driven member in a coaxial relation to each other, a pair of friction shoe members displaceably supported by said driving member for movement away from each other and into engagement with said internal drum surface under the action of the centrifugal force of said friction shoe members, and spring means for urging said friction shoes generally towards each other and out of engagement with said internal drum surface, the improvement comprising a pair of cam shafts rotatably mounted in said driving member and extending parallel to the axis of rotation of the clutch, a cam and an arm on each of said cam shafts, a cam surface on each of said friction shoe members provided between one of said cams and the clutch axis and extending at substantially right angles to the direction of the centrifugal force on said friction shoe member, said cam and said arm being arranged in such an angular relation about the axis of said cam shaft that said cam is set at an inoperative position with respect to said cam surface when said arm is directed radially outwards with respect to the clutch axis and that angular displacement of the arm from said radial position in a rotational direction opposed to the rotation of the driving member causes said cam to push said cam surface inwards, whereby said friction shoe carrying said cam surface is shifted out of engagement with said internal drum surface against the action of the centrifugal force on said friction shoe, and means for operating said arms comprising a supporting member rigidly connected with said bearing means and an operating member movably supported by said supporting member and manually shiftable between an inoperative position and an operative position in which said operating member projects into the path of rotation of said arms about the clutch axis so as to shift said arms angularly in a rotational direction opposed to the rotation of said clutch.

2. A centrifugal clutch as claimed in claim 1 in which each of said cams has a summit portion, and in which said operating member in its operative position turns each of said arms and said cam shaft connected thereto into an angular position in which a radius from said shaft axis to said summit forms right angles with said cam surface.

3. A centrifugal clutch as claimed in claim 2 in which each of said cam shafts is rotatably mounted in an out-of-round bore in said driving member providing a play for said cam shaft in said bore in the direction of the centrifugal force on said friction shoe member.

* * * * *